(12) United States Patent
Skullestad et al.

(10) Patent No.: US 9,958,237 B2
(45) Date of Patent: May 1, 2018

(54) METHOD AND SYSTEM FOR PLANNING AND LAUNCHING A PLURALITY OF MISSILES TO BE INCLUDED IN THE SAME MISSION

(71) Applicant: Kongsberg Defence & Aerospace AS, Kongsberg (NO)

(72) Inventors: Age Johan Skullestad, Kongsberg (NO); Terje Straume, Kongsberg (NO); Kare Lowe, Kongsberg (NO); Rune Andre Haugen, Vestfossen (NO)

(73) Assignee: KONGSBERG DEFENCE & AEROSPACE AS, Kongsberg (NO)

( * ) Notice: Subject to any disclaimer, the term of this patent is extended or adjusted under 35 U.S.C. 154(b) by 0 days. days.

(21) Appl. No.: 15/235,856

(22) Filed: Aug. 12, 2016

(65) Prior Publication Data

US 2017/0160057 A1  Jun. 8, 2017

(30) Foreign Application Priority Data

Aug. 12, 2015  (NO) .................................... 20151017

(51) Int. Cl.
*G06F 19/00* (2011.01)
*F41G 7/00* (2006.01)
(Continued)

(52) U.S. Cl.
CPC ............... *F41G 7/007* (2013.01); *F41G 3/04* (2013.01); *F41G 7/2233* (2013.01); *F41G 7/343* (2013.01); *G05D 1/104* (2013.01); *G05D 1/107* (2013.01)

(58) Field of Classification Search
CPC ..... F41G 7/007; F41G 3/06; F41J 5/06; G05B 19/00; G06G 7/80
(Continued)

(56) References Cited

U.S. PATENT DOCUMENTS 4,997,144 A    3/1991  Wolff et al.
5,273,236 A *  12/1993 Wootton ............... F41G 7/2233
                                                244/3.11
(Continued)

FOREIGN PATENT DOCUMENTS

DE   10 2006 007 142 A1   8/2007
WO        96/08688 A       3/1996

OTHER PUBLICATIONS

Pentagon Fires Off Two SM-3 Missiles in Successful Test, Huffpost Politics, by Andrea Shala-Esa, Sep. 19, 2013.
(Continued)

*Primary Examiner* — Karl D Frech
(74) *Attorney, Agent, or Firm* — Young & Thompson

(57) ABSTRACT

A method for planning and launching two or more missiles, to be included in the same mission, and where this is done from one or more aircraft in such a way that the missiles arrive at same target approximately at the same time without interfering with each other on the way to the target. The planning of the mission is performed by sending a set of identical mission data to the missiles prior to launch; letting each missile be assigned a unique identity, letting each missile calculate identical trajectories and a unique offset to this, in one or more of four dimensions, where a resulting offset trajectory is unique for each missile and based on the identical mission data and unique identity, and launching the missiles included in the same mission.

17 Claims, 1 Drawing Sheet

Figure 1:
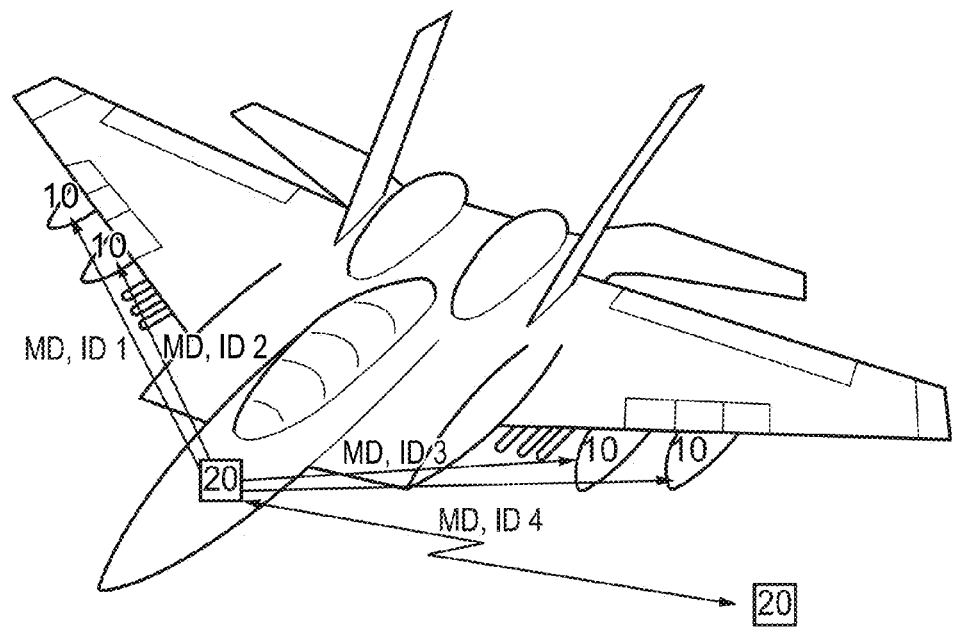

(51) Int. Cl.
*F41G 3/04* (2006.01)
*F41G 7/22* (2006.01)
*F41G 7/34* (2006.01)
*G05D 1/10* (2006.01)

(58) Field of Classification Search
USPC .................................................. 235/400, 404
See application file for complete search history.

(56) References Cited

U.S. PATENT DOCUMENTS

| | | |
|---|---|---|
| 5,379,966 A | 1/1995 | Simeone et al. |
| 5,855,339 A * | 1/1999 | Mead ..................... F41G 7/308 |
| | | 244/3.11 |
| 6,196,496 B1 | 3/2001 | Moskovitz et al. |
| 7,960,675 B2 | 6/2011 | Grabmeier |
| 2012/0249357 A1* | 10/2012 | Stratis .................... H01Q 1/281 |
| | | 342/54 |

OTHER PUBLICATIONS

NO Search Report, dated Mar. 10, 2016, from corresponding NO application.

* cited by examiner

METHOD AND SYSTEM FOR PLANNING AND LAUNCHING A PLURALITY OF MISSILES TO BE INCLUDED IN THE SAME MISSION

INTRODUCTION

The invention relates to a method and system for performing planning and launching of two or more missiles from one or more aircraft in such a way that the missiles arrive at the same target approximately at the same time, following the same or different trajectories and assuring that the missiles do not interfere with each other on the way to the target.

BACKGROUND OF THE INVENTION

Modern military vessels typically carry weapons such as unmanned aerial vehicles, missiles or cruise missiles that are jet powered and launched from a vessel at high speeds. Missions for such missiles can be planned in its totality on the ground, so called pre-planned missions. It can also be planned partially or entirely in the air while being carried by an aircraft. This is often called re-planning or re-targeting in the first case and a so called target of opportunity in the second case. It is also well known that the functionality of mission planning in the latter two cases can be performed on board a missile.

The paper titled "Mission Planning Technology" by Erik Berglund (June, 2001, RTO-EN-018) touches on the subjects mission planning and re-planning for missiles during flight. It is however only mentioned that this is possible due to technological advances without mentioning how mission planning is performed.

Boeing has developed a system called SLAM ER with an ability to attack a land-based target of opportunity. The system has a target-of-opportunity mode allowing a pilot to send target coordinates to the missile on a wing of an aircraft prior to launch. After launch, the missile flies toward the target location and provides infrared seeker video back to the control aircraft for standoff and man-in-the-loop terminal control. This can be used for re-planning by redirecting missions for avoiding unexpected targets such as missile launchers, or direct a missile to a secondary target after primary targets are destroyed.

DE-102006007142 A1 describes a method for positioning an unmanned missile. Target data are transferred to a missile prior to launch, and mission planning is performed in the missile.

A second functionality that is well known is the so called Time on Target feature. This consists in the capability of the cruise missile to arrive at a designated target at a designated time when told to do so. This opens up the possibility to have two or more missiles arriving at the same (or different or slightly different) target at the same time (a so called salvo or ripple mission) and in this way trying to overwhelm the defense mechanisms of the target. A typical target in such a case can be a well defended ship or a strategically important ground-based target.

When a salvo mission for a group of air launched cruise missiles is planned on the ground well before the designated Time on Target, it poses the problem of having to plan a very exact time of launch of all the participating missiles well into the future. If one or more aircraft should fail to reach its area of launch in time, there will be a risk for the whole mission. A re-planning of the mission demands the capability to communicate the totality of the mission from a central computing machine. Re-planning communication can be sent from some land-based station or from one of the airplanes taking part in the mission. The kind of computing and transmission capabilities necessary for performing a re-planning is however not common for an aircraft. The bandwidth required for the communication between an airplane and missiles is not ordinarily available in the air.

To solve this and to allow for a target of opportunity type of mission, one can use the mission planning capabilities of modern missiles. According to the present invention planning or re-planning a salvo mission in the air is performed by letting all missiles plan the exact same mission. In this way they will all have routes that allow them to reach to the same target at the same time or approximately the same time. The problem with this solution is however that there is a high risk of interference and impact between the missiles as they will all try to travel the same route at the same time. The present invention describes a way of overcoming this problem.

SHORT DESCRIPTION

The present invention proposes a way to overcome the above mentioned problems. This is made possible by communicating the exact same mission data to all the missiles together with a missile identity in such a way that each missile gets a different and unique identity in a set of identities.

The inventive method is more specifically defined by planning a mission and launching two or more missiles, to be included in the same mission, from one or more aircraft, and in such a way that the missiles arrive at same target approximately at the same time without interfering with each other on the way to the target.

The planning of the mission is performed by sending a set of identical mission data to said missiles prior to launch; letting each missile be assigned a unique identity; letting each missile calculate identical main trajectories and trajectories with a unique offset to the main trajectory in one or more of four dimensions, where a resulting offset trajectory is unique for each missile and is based on said identical mission data and the unique identity, and launching the missiles to be included in the same mission, and where each missile follows a unique trajectory.

The method will allow the missiles to plan essentially the same but slightly different routes towards the target without affecting the capability to arrive at the target approximately simultaneously.

Further features of the method are defined in the dependent claims.

DETAILED DESCRIPTION

Figure 2:
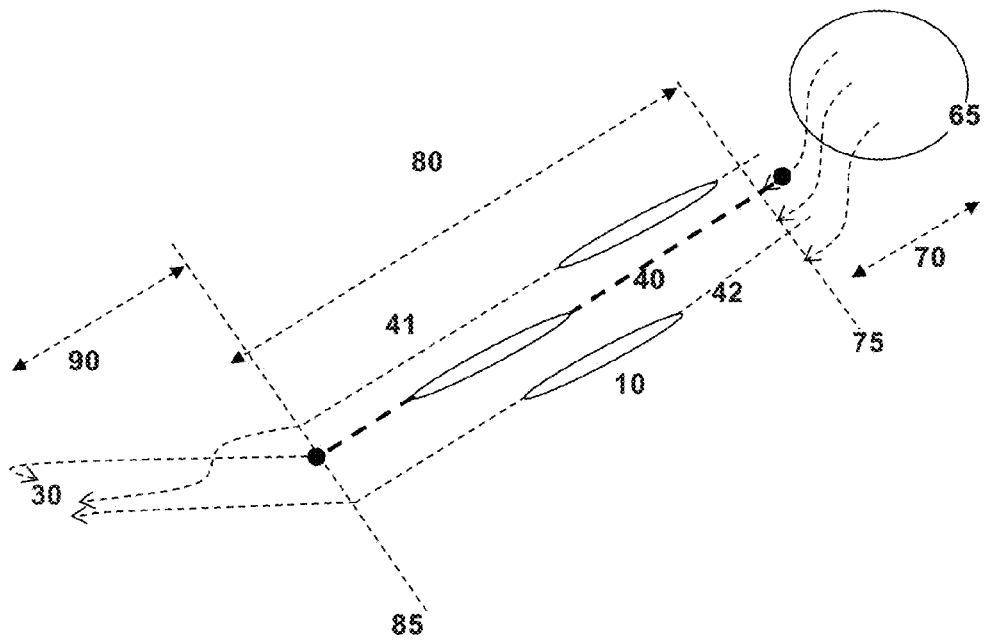

The invention will now be described in detail with reference to the figures where:

FIG. 1 shows an aircraft carrying several missiles and a communication link for transferring mission data and unique identity to the missiles, and FIG. 2 shows three distinct parts of a trajectory for missiles directed to the same target.

A mission can be planned from a varying set of input data defining the mission, e.g. a set of coordinates. In its simplest form such data may comprise information of a target 30 and an area 65 where a missile 10 is to be launched. More complicated data may comprise extensive and complicated missions with areas where a missile 10 must pass (must fly points) as well as zones where a missile 10 can not fly (no fly zones), and where this mission information is given in four dimensions, i.e. three in space and one in time. The common feature of all scenarios is that it leads to a detailed description of the trajectory 40 to be followed. A trajectory 40 is often referred to as a set of waypoints. Several waypoints define a route that a missile 10 follows on its way to a target 30. Waypoints can be linked to a specific time and possibly in addition to other parameters like radio-reception capability, active counter measures from anti-missile missile (AMM) or other anti-missile weapons, grouped as anti-missile systems.

In a normal general case the total trajectory that the missiles will follow from launch 65 to target 30 can be split into three distinct parts as illustrated in FIG. 2. The first part 70 is from launch 65 to trajectory entry-point 75. The second part 80 is from entry-point 75 to exit-point 85. The third and last part 90 is from exit-point 85 to target 30.

The trajectory-entry-point is where the planned mission trajectory starts. As the missile cannot know exactly where it is launched, there will always be a short flight from launch 65 to entry-point 75 which is not planned in detail, meaning that the exact flight pattern cannot be planned upfront in this section of the trajectory. This does not mean that it is not planned. It only means the plan is of a different and less fixed type. An exit-point 85 is where the missile stops flying a planned trajectory. In the normal case a mission must allow for the option that the target 30 is not exactly where it is supposed to be and therefore the mission must allow the missile to make autonomous decisions regarding trajectory at some point in time. This can be a planned point along the trajectory. In some cases this point may be the target which means that the missile will fly a planned trajectory all the way, or in other words that the third trajectory part does not exist. In other cases the mission can allow for exceptions along the way which means that the missile can be allowed to deviate from the planned trajectory for a certain time and then return to its trajectory as an autonomous decision. In other cases again it might be left up to the missile itself to decide when to enter the third part of the trajectory. In general however one can assume that a salvo mission planned like we describe in this disclosure will always have a common trajectory with a starting point and an end point. It is important to understand that the missile unique part of the mission data will always contain information on how to enter the common part, in other words pertaining to the starting point, an offset to the common part along the second part of the trajectory, and some information pertaining to how to exit from the common part, in other words how to enter the third part of the trajectory.

In a salvo mission it is desirable to let all missiles attack the same target at the same time but also to let each missile perform some missile specific actions. Generally we can say that the mission parameters can be split in a common part and in a missile specific part. The missile specific parts can be stored and communicated to all missiles in the salvo as a data set where each missile can find its place in the data set by using its assigned unique identity. In this way all missiles in the salvo receive the same mission, but use their unique identities to plan missions that may be slightly different. In a preferred embodiment of the invention this is organized as a two dimensional table, where one dimension is the missile unique identity and the other dimension is the missile specific behavior.

Typical entries in the above mentioned data set can be the offset to the common trajectory as a function of distance or time along this trajectory. The offset can be in any or all of the four dimensions. It may also be behavior related to the radio connection with so called home base, e.g. which of the missiles should turn on its radio at which time. Near-field communication codes may also be used for allowing the missiles to communicate with and identify each other. These codes can be directly or indirectly communicated based on the before mentioned unique missile identity. Missile specific behavior may further be used in case the target is not found where it was expected to be and the salvo mission as such cannot be maintained, e.g. one missile searches to the left, one to the right, or similar.

FIG. 1 illustrates an aircraft carrying several missiles 10 and a communication link for transferring mission data (MD) and a unique identity to each missile 10.

The present invention defines a method for launching two or more missiles 10, to be included in the same mission, from one or more aircraft 20 in such a way that the missiles 10 arrive at same target 30 approximately at the same time without interfering with each other on the way to the target 30. The planning of the mission is performed in several steps.

The first step of the method is sending a set of identical mission data, MD, to said missiles 10 prior to launch. Mission data comprises coordinates of a launch area and a target 30. It may also contain information about the target, information of possible threats in the area, information of friendly forces and many other things. In one embodiment the mission data are sent via a wire or an umbilical connected to each missile 10 prior to launch. In another embodiment mission data are sent to each missile 10 wirelessly. A mission can typically be split into three different phases.

FIG. 2 illustrates these three different phases or parts. A first part 70 of a mission is from a launch area 65 to a first common starting point 75. A second part 80 is the transportation phase. A last and third part 90 of the mission is the part closest to a target 30. One can consider the first and third parts 70, 90 to be semi-autonomous where there is no exactly predefined trajectory, since the exact place and time of launch in the first part 70 can not be predicted. This is also the case for the third part 90 where the exact position of the target 30 can not be predicted, or more precisely should not be predicted in order to keep mission flexibility in this last phase.

Comprised in the mission data sent to the missiles 10 is a set of rules on how to react to each unique identity, ID. For instance a mission with three missiles a, b and c can contain the following: missile a) shall fly the common trajectory for ten seconds before the main mission time, missile b) shall follow the trajectory on the main mission time whereas missile c) shall fly ten seconds behind the main mission time. It may also comprise for instance the information that only missile a) shall have radio connection to home base in the first part 70 of the trajectory whereas missile b) shall have this in the second part 80 etc.

The next step is letting each missile 10 be assigned a unique identity. The unique ID can be any number or code making each missile 10 unique in the mission. Transmission of each unique ID is preferably performed after transmission of identical mission data. If the signal connection between an airplane and a missile 10 is wired, each missile 10 will receive its unique ID via the wire. If we accept the restriction that the salvo mission is to be launched from a single aircraft, the unique ID can also be implicitly extracted from the unique number of the weapon station holding each missile. One could also imagine a scheme where the mission can be launched from two or more aircraft if we use the aircraft identity and the weapons store number to generate the missile unique identity. This however implies that the common mission data would need to contain the identity of the aircraft and the position of the participating weapons and this means the procedure to generate the common mission data would become less general and less flexible.

If the signal connection to a missile 10 is wireless a unique ID can be assigned by transmitting a set of ID's to the missiles, and where the missiles respond to a specific ID according to a preset rule and each missiles own internal ID.

If missiles 10 to be launched in the same mission are launched from two or more airplanes, the airplanes must coordinate unique ID's to be assigned to each missile 10 in the mission. As an example we can consider a target of opportunity mission with missiles launched from three aircraft (AC). Assuming AC1 is lead and decides a salvo mission with seven missiles towards target X, where target X with coordinates is known to all three aircraft. Some minimum mission data must be transmitted from AC1 to AC2 and AC3 like how many missiles from each and which type of mission, coordinates of a launch area, and of course which target. The common mission data can now either be generated at AC1 and distributed in its entirety or it can be based on common data that is available in all three AC's where only the instructions on how to generate this common mission data is transmitted. In the second case the three aircraft must confirm that they have common data on crucial topics like maps, enemy radar etc. As an example we can invent a mission where missiles with identities 1, 2 and 3 come from AC1, missiles with identities 4 and 5 come from AC2 and missiles with identities 6 and 7 come from AC3. Which missiles are to be launched from which AC can either be decided and communicated in detail or it can be the result of some implicit rule like for the case above, the first three missiles come from AC1, the second two from AC2 and the last two from AC3. This implies that there must be some common known identity of the aircraft.

To ensure that each missile 10 has received the mission data and the unique ID, each missile 10 can in one embodiment of the invention transmit a confirmation signal confirming that mission data and assigned identity have been received. The mission will preferably only be launched if all missiles taking part in the same mission confirm successful reception of mission data and assigned identity.

Each missile 10 may further transmit information comprising an area of accepted launch that allow the reaching of the first that must be passed, i.e. must fly point, within an acceptable timeframe.

The next step of the inventive method is letting each missile 10 calculate identical main trajectories 40 and trajectories with a unique offset to the main trajectory 40 in one or more of four dimensions. The resulting offset trajectory 41, 42 is unique for each missile 10 and is based on said identical mission data, MD, and the unique identity, ID. Said four dimensions are the three degrees of freedom in space as well as time. In the before mentioned confirmation signal or in a second confirmation signal the missiles can signal if mission planning activity has been successful or not. It is also a possibility to let each missile calculate a confirmation code, e.g. checksum, based on the common part of the generated mission plan in such a way that a different mission plan will, with a very high probability, also lead to a different confirmation code. Techniques like this are commonly known as a checksum or hash sum. Each missile can then communicate this code to its host AC and the AC or the pilot can check if all codes from all missiles are the same and thus confirm with a very high likelihood that also the common part of the mission plan are the same for all missiles.

After the prior calculation step the missiles 10 to be included in the same mission will be launched, and each missile will follow a unique trajectory 40.

Normally a mission will be launched only if all missiles taking part in the same mission signal successful reception of mission data and assigned identity. Along with this confirmation of success, each missile can signal a rough outline of the mission with trajectory and other important details so that a pilot can make a visual confirmation that the mission has been planned like anticipated and does not violate some criteria like an area that shall not be crossed.

There are many different ways to calculate trajectories 40, 41, 42. In one embodiment of the invention, the trajectories 40, 41, 42 calculated are the same or approximately the same for at least two missiles 10 included in the same mission with two or more missiles 10. In another embodiment, at least one calculated trajectory 41 is different for at least one missile 10 in the same mission with two or more missiles 10. Even though two or more missiles are following the same trajectory, the missiles can be spaced apart in time.

Trajectories 40, 41, 42 calculated for each missile 10 may be identical from a first must fly point 75 on the trajectory 40 to a point 85 on the trajectory 40 where the missiles 10 enter an autonomous search mode. Further, the offset at the end 85 of each trajectory 40 may be different at a second must fly point 85 than for the rest of the trajectory 40. The autonomous mode is typically entered when a missile 10 is at the last part or phase of its trajectory, i.e. prior to impact of a target 30. Switching to an autonomous mode is necessary for individual adjustment of the trajectory that a missile 10 is to follow prior to hitting a target 30. This enables the option that the missiles 10 can attack a target 30 from different directions and angles, thus outmaneuvering possible anti-missile systems.

After the missiles 10 have been launched they may transfer information to each other, e.g. by near field communication. The purpose is to become aware of each other and to exchange information relative to their mission. In this communication the missiles can use their assigned unique ID's to identify each other. Knowing the number and identity of the other missiles in the mission allows for a communication scheme where one of the missiles has radio contact with a home base and acts as relay for the others, or distributes and collects information in an ordered way. This can be done in the case of a target update command from home base by communicating the target update to all other missiles in the mission and then collect an acknowledgment from all missiles before sending a final acknowledgment back to home base.

If an obstacle is detected by one or more of the missiles 10 after launching the missiles they can 10 communicate this to each other by means of said near field communication. The main trajectory 40 for the missiles 10 can be continuously adjusted in order to avoid impact with a possible detected obstacle in one or more of the trajectories that the missiles 10 are following on the way to the target 30.

A typical mission can be as follows: A high value sea-target, for instance a destroyer or similar, that has been detected well into a sea area of an enemy is chosen as target. An aircraft is already in the air in an area where a standoff mission can be launched with four missiles and it is decided that these four missiles shall be fired against the target in a salvo mission. The details of the mission are transmitted to the aircraft, including the position of the destroyer, its assumed direction and speed of travel, and the number of missiles to be fired in the salvo mission. The pilot has already information of the enemy on radar and other relevant information that allows him to set up some must-fly-points or no-fly-zones to assure that the missiles stay well out of reach of all known threats. There are several other parameters that are important to a mission but they are not relevant for fully describing the invention. The pilot choses a standard salvo-scheme consisting of a variation of offsets both in time and space, for instance lateral to the trajectory, along with the planned mission. The missile to be in charge of the mission and keeping contact with home base is chosen. This will enable reception of target updates that can be communicated to the other three missiles during the mission. In this way a data set is prepared having information about offset from the common mission for each missile in the salvo. Now the common mission data are transferred from aircraft to the four missiles and a unique identity that allows each missile to identify its role in the common data set is transferred separately to each missile. Each missile will first respond by acknowledging that mission data has been well received and then each missile will perform mission planning based on both the common mission data and the missile specific data. It is important that the trajectory of each missile is calculated first, based solely on the information from the common mission for eliminating the possibility of resulting different trajectories, after which the information from the missile specific part is used to create the variations that allow this to become a salvo mission. Each missile will also communicate back to the aircraft whether the planning was successful and resulted in a valid plan with a high probability of success. It is of high interest to the pilot to see a rough map of the trajectory of each missile so as to make a visual confirmation that everything went as expected.

One object of the invention is to define a method for generating the second part 80 of the trajectory 40 for missiles 10 to be included in the same mission, including both the entry and the exit point 75, 85 of said second part 80. The first and third parts 70, 90 of the trajectories will vary and should be left to be decided in each mission.

Another object of the invention is to provide a missile 10 comprising means for planning a mission together with two or more similar missiles 10 launched from one or more aircraft 20 in such a way that the missiles 10 arrive at same target 30 approximately at the same time without interfering with each other on the way to the target 30.

In order to achieve this the missile 10 comprises input means for receiving mission data, MD, that is identical for all missiles 10 in same mission, and which is sent prior to launch of the missiles 10.

The input means will also receive a unique identity, ID, assigned to the missile 10.

In one embodiment, the input means for receiving the MD and the ID is an umbilical connected between the missile 10 and its carrier. In another embodiment the input means is a wireless receiver.

In yet another embodiment, the input means for receiving the MD is an umbilical while the input means for receiving the ID is a wireless receiver, or vice versa.

The missile 10 according to the invention further comprises calculating means for calculating a main trajectory 40 and a trajectory with a unique offset, to the main trajectory 40, in one or more of four dimensions, where a resulting offset trajectory 41, 42 is unique for the missile 10 and is based on received identical mission data, MD, and the received identity, ID.

The missile further comprises a transceiver for near-field communication with the missiles 10 in the same mission, and a transmitter for transmitting a confirmation signal. In one embodiment the transmitter used for the confirmation signal is the transceiver used for near-field communication.

The present invention enables planning or re-planning of a salvo mission launched from one or more aircraft by letting all missiles 10 first plan the same mission with identical main trajectories 40, and then let each missile calculate a unique offset trajectory to this based on a unique ID assigned to each missile. In this way they will all have routes that will not interfere with each other on the way to a target 30.

The invention claimed is:

1. A method for planning a mission and launching two or more missiles, to be included in the same mission, from one or more aircraft in such a way that the missiles arrive at the same target approximately at the same time without interfering with each other on the way to the target, planning of the mission comprising the steps of:

sending a set of identical mission data, MD, to said missiles prior to launch, the identical mission data, MD, assigning each of the missiles to hit a same target;

letting each missile be assigned a unique identity, ID;

letting each missile calculate identical main trajectories and trajectories with a unique offset to the main trajectory in one or more of three dimensions in space and one dimension in time, where a resulting offset trajectory is unique for each missile and is based on said identical mission data, MD, and the unique identity, ID to the assigned same target; and launching the missiles to be included in the same mission, and where each missile follows a trajectory with the unique offset to the assigned same target.

2. The method according to claim 1, where the mission data are sent to each missile via an umbilical.

3. The method according to claim 1, where the mission data are sent to each missile wirelessly.

4. The method according to claim 1, where the unique identity is extracted from the unique number of a weapon station holding each missile.

5. The method according to claim 1, where the mission data contains a set of rules on how to react to each unique identity.

6. The method according to claim 5, where the set of rules are organized like a two-dimensional table with one dimension being the unique identity and the other dimension the behavior.

7. The method according to claim 1, where the unique identity of each missile in the mission is used to identify the missile in near-field communication with the other missiles in the mission.

8. The method according to claim 1, where each missile transmits a confirmation signal confirming received mission data and assigned identity.

9. The method according to claim 8, where a mission with missiles is launched only if all missiles taking part in the same mission confirm successful reception of mission data and assigned identity.

10. The method according to claim 8, where each missile further transmits information comprising an area of accepted launch that allow the reaching of a first must fly point within an acceptable timeframe.

11. The method according to claim 1, where the main trajectory for the missiles in the mission is continuously adjusted for avoiding impact with possible detected obstacle in one of the trajectories of the missiles on the way to the target.

12. The method according to claim 1, where the missiles communicate with each other for simultaneous adjusting of the trajectories.

13. A missile comprising means for planning a mission together with two or more similar missiles launched from one or more aircraft in such a way that the missiles arrive at same target approximately at the same time without interfering with each other on the way to the target, comprising:
- input means for receiving mission data, MD, that is identical for all missiles in same mission, and which is sent prior to launch of the missiles, the identical mission data, MD, assigning each of the missiles to hit a same target;
- input means for receiving a unique identity, ID, assigned to the missile;
- calculating means for calculating a main trajectory and a trajectory with a unique offset to the main trajectory in one or more of three dimensions in space and one dimension in time, where the missile is to follow the resulting offset trajectory which is unique for the missile and is based on received identical mission data, MD, and the received identity, ID to the same target.

14. The missile according to claim 13, where the input means is an umbilical connected between the missile and its carrier.

15. The missile according to claim 13, where the input means is a wireless receiver.

16. The missile according to claim 13, further comprising transmitter for transmitting a confirmation signal.

17. The missile according to claim 13, comprising transceiver for near-field communication with the missiles in the same mission.

* * * * *